United States Patent

Kuroda et al.

[11] Patent Number: 5,373,732
[45] Date of Patent: Dec. 20, 1994

[54] COMBUSTION STATE-DETECTING SYSTEM FOR INTERNAL COMBUSTION ENGINES

[75] Inventors: Shigetaka Kuroda; Kazutomo Sawamura; Kenichi Maeda; Yuichi Shimasaki, all of Wako, Japan

[73] Assignee: Honda Giken Kogyo Kabushiki Kaisha, Tokyo, Japan

[21] Appl. No.: 149,921

[22] Filed: Nov. 10, 1993

[30] Foreign Application Priority Data

Nov. 11, 1992 [JP] Japan ................................. 4-325930

[51] Int. Cl.⁵ ............................................. G01M 15/00
[52] U.S. Cl. ................................................... 73/117.3
[58] Field of Search ............... 73/116, 117.3; 123/419, 123/436; 364/431.07, 431.08

[56] References Cited

U.S. PATENT DOCUMENTS 5,044,195 9/1991 James et al. ...................... 73/117.3
5,117,681 6/1992 Dosdall et al. ...................... 73/116
5,200,899 4/1993 Ribbens et al. ...................... 73/116

FOREIGN PATENT DOCUMENTS

3-286166 12/1991 Japan .

*Primary Examiner*—Robert Raevis
*Attorney, Agent, or Firm*—Nikaido, Marmelstein, Murray & Oram

[57] ABSTRACT

A combustion state-detecting system for an internal combustion engine calculates a first average speed by averaging the rotational speed of the engine over a time period corresponding to duration of one stroke of a cylinder, and a second average speed by averaging the rotational speed of the engine over a time period corresponding to duration of one cycle of all strokes of the cylinder. The system calculates a difference between the first average speed and the second average speed, and determines based on the difference whether or not the combustion state of the engine is abnormal.

5 Claims, 8 Drawing Sheets

COMBUSTION STATE-DETECTING SYSTEM FOR INTERNAL COMBUSTION ENGINES

BACKGROUND OF THE INVENTION

1. Field of the Invention

This invention relates to a combustion state-detecting system for detecting a state of combustion (misfiring) in internal combustion engines, based on a variation in the angular velocity of the crankshaft during rotation of the engine in every combustion cycle.

2. Prior Art

To detect a cylinder of an internal combustion engine in which normal combustion does not take place due to failure in the ignition system, the fuel supply system, or the like, an abnormality-detecting device has been proposed e.g. by Japanese Provisional Patent Publication (Kokai) No. 3-286166, which detects a rate of variation in the angular velocity of the crankshaft during rotation of the engine in every combustion cycle, to thereby determine whether or not an abnormality has occurred in any of the cylinders, based on the detected rate of variation in the angular velocity of the crankshaft.

According to this conventional device, an output from a crank angle sensor provided at the crankshaft is directly supplied to the abnormality-detecting device, and the pulse repetition period of the sensor output is measured to detect a rotational speed, i.e. the angular velocity, of the crankshaft. However, the above device suffers from the following inconveniences:

(1) A pulser, which constitutes the crank angle sensor, requires as high an accuracy as is almost equal to a limit value obtainable by mechanical working, and therefore, dimensional errors produced during manufacturing of the device can result in an erroneously large rate of variation in the rotational speed of the crankshaft, based on which a normal combustion can be erroneously determined to be abnormal, i.e. a misfire.

(2) The rate of variation in the rotational speed of the crankshaft also varies with different output characteristics among individual engines, which can lead to an erroneous determination of a misfire, similarly to the above.

(3) When a vehicle on which the engine is installed is travelling on a bad road or the like, a large variation in the rotational speed of the crankshaft occurs due to vibrations of wheels of the vehicle, which can also cause the device to erroneously determine that a misfire has occurred.

SUMMARY OF THE INVENTION

It is an object of the invention to provide a combustion state-detecting system for an internal combustion engine, which is capable of eliminating factors other than the combustion state of the engine, such as variation in output characteristics between individual crank angle sensors and engines, and influence of vibrations of wheels of a vehicle on which the engine is installed, to thereby carry out an accurate misfire determination.

To attain the above object, the present invention provides a combustion state-detecting system for an internal combustion engine having a crankshaft and at least one cylinder, including crank angle signal-generating means for generating a crank angle signal indicative of a crank angle of the crankshaft at a repetition period corresponding to a predetermined rotational angle of of the crankshaft, the repetition period being shorter than a repetition period of ignition of the engine, and rotational speed-detecting means for detecting a rotational speed of the engine whenever the crank angle signal is generated.

The combustion state-detecting system according to the invention is characterized by comprising:

first averaging means for calculating a first average speed by averaging the rotational speed of the engine over a time period corresponding to duration of one stroke of one of the at least one cylinder;

second averaging means for calculating a second average speed by averaging the rotational speed of the engine over a time period corresponding to duration of one cycle of all strokes of the one of the at least one cylinder; and combustion state-detecting means for calculating a difference between the first average speed and the second average speed, and determining based on the difference whether or not the combustion state of the engine is abnormal.

Preferably, the combustion state-detecting means determines whether or not the combustion state of the engine is abnormal, by comparing the difference between the first average speed and the second average speed with a predetermined reference value.

Preferably, the combustion state-detecting means determines that the combustion state of the engine is abnormal when a characteristic of variation in the difference between the first average speed and the second average speed agrees with a predetermined reference characteristic of the variation in the difference between the first average speed and the second average speed peculiar to occurrence of a misfire.

More preferably, the predetermined characteristic of the variation in the difference between the first average speed and the second average speed is that the difference continues to change in the same direction over whole of the time period corresponding to duration of one stroke of one of the at least one cylinder.

Further preferably, the predetermined characteristic of the variation in the difference is that a value of the difference obtained by subtracting the second average speed from the first average speed assumes a negative value over the whole of the time period corresponding to one stroke of one of the at least one cylinder, except for a starting portion thereof, with the value of the difference obtained becoming lowest at an end portion of the time period corresponding to duration of one stroke of the at least one cylinder, and assumes a negative value over a time period corresponding to a starting portion of the following time period corresponding to duration of one stroke of the one of the at least one cylinder, with an absolute value of this negative value being reduced.

The above and objects, features, and advantages of the invention will be more apparent from the following detailed description taken in conjunction with the accompanying drawings.

DETAILED DESCRIPTION

The invention will now be described in detail with reference to the drawings showing embodiments thereof.

Figure 1:
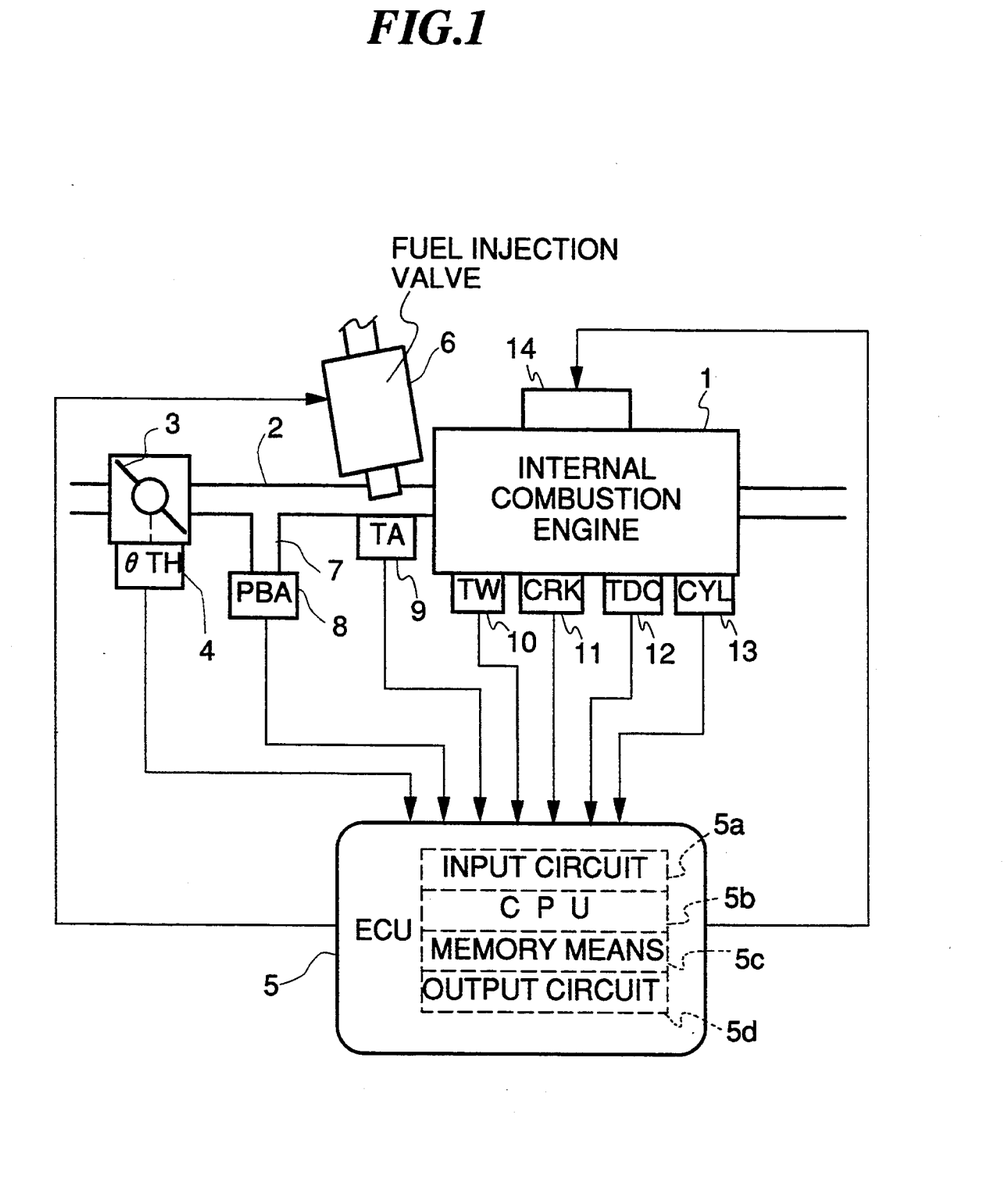
FIG. 1 is a block diagram showing the whole arrangement of an internal combustion engine incorporating a combustion state-detecting system according to an embodiment of the invention.

Referring first to FIG. 1, there is shown the whole arrangement of a 4-cylinder/4 stroke-cycle internal combustion engine incorporating a combustion state-detecting system according to an embodiment of the invention. In an intake pipe 2 of the engine 1, there is arranged a throttle valve 3, to which is connected a throttle valve opening ($\theta TH$) sensor 4 for generating an electric signal indicative of the sensed throttle valve opening and supplying the same to an electronic control unit (hereinafter referred to as "the ECU") 5.

Fuel injection valves 6 are provided for respective cylinders of the engine and each arranged in the intake pipe 2 at a location between the engine 1 and the throttle valve 3 and slightly upstream of an intake valve, not shown, of each cylinder. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is provided in communication with the interior of the intake pipe 2 via a conduit 7 at a location immediately downstream of the throttle valve 3 for supplying an electric signal indicative of the sensed absolute pressure to the ECU 5. An intake air temperature (TA) sensor 9 is inserted into the intake pipe 2 at a location downstream of the intake pipe absolute pressure sensor 8 for supplying an electric signal indicative of the sensed intake air temperature TA to the ECU 5.

An engine coolant temperature (TW) sensor 10, which may be formed of a thermistor or the like, is mounted in the cylinder block of the engine 1 for supplying an electric signal indicative of the sensed engine coolant temperature TW to the ECU 5.

A cylinder-discriminating sensor (hereinafter referred to as "the CYL sensor") 13, a top dead point (TDC) sensor 12, and a crank angle (CRK) sensor 11 are arranged in facing relation to a camshaft or a crankshaft of the engine 1, neither of which is shown. These sensors 11 to 13 are each formed of a magnetic pickup or a pulser. The CYL sensor 13 generates signal pulses (hereinafter referred to as "CYL signal pulses") at a predetermined crank angle of a particular cylinder of the engine 1. The TDC sensor 12 generates a TDC signal pulse at a predetermined crank angle before a top dead point (TDC) of each cylinder corresponding to the start of the intake stroke of the cylinder (e.g. whenever the crankshaft rotates through 180 degrees when the engine is of the 4-cylinder type). The CRK sensor 11 generates crank angle pulses (hereinafter referred to as "CRK signal pulses") at predetermined crank angles with a repetition period shorter than the repetition period of TDC signal pulses (e.g. whenever the crankshaft rotates through 30 degrees). The CYL signal pulses, TDC signal pulses, and CRK signal pulses are supplied to the ECU 5.

Arranged in each cylinder of the engine 1 is a spark plug 14, which is electrically connected to the ECU 5.

The ECU 5 comprises an input circuit 5a having the function of shaping the waveforms of input signals from various sensors mentioned above, shifting the voltage levels of sensor output signals to a predetermined level, converting analog signals from analog-output sensors to digital signals, and so forth, a central processing unit (hereinafter referred to as "the CPU") 5b, memory means 5c storing various operational programs which are executed by the CPU 5b and for storing results of calculations therefrom, etc., and an output circuit 5d which outputs driving signals to the fuel injection valves 6 and the spark plugs 14.

The CPU 5b operates in response to signals from the above-mentioned sensors to determine operating conditions in which the engine 1 is operating, and calculates, based upon the determined engine operating conditions, a fuel injection period of each of the fuel injection valves 6 and ignition timing of each of the spark plugs 14, which are energized in synchronism with TDC signal pulses, to thereby generate driving signals for driving the fuel injection valves 6 and the spark plugs 14 via the output circuit 5d.

Figure 2:
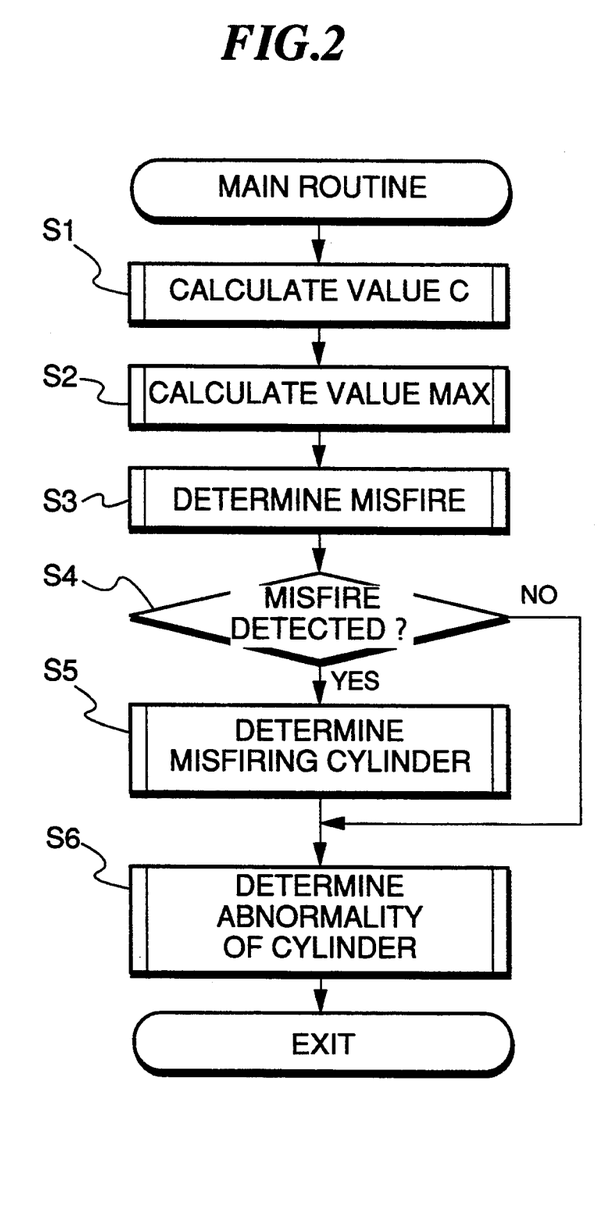
FIG. 2 is a flowchart showing a main routine for determining a state of combustion of the engine.

FIG. 2 shows a main routine which is executed by the CPU 5b for determining a state of combustion of the engine 1. This program is carried out in synchronism with generation of CRK signal pulses.

At steps S1 and S2 of the program, values C and MAX to be used for misfire determination at a step S3 are calculated, respectively. At the step S3, misfire determination is carried out by the use of these parameters. When it is determined at the step S3 that a misfire has occurred, a cylinder in which a misfire has occurred is discriminated at steps S4 and S5, and at a step S6, abnormality of the cylinder is determined based on the number of times of misfire determination.

Figure 3:
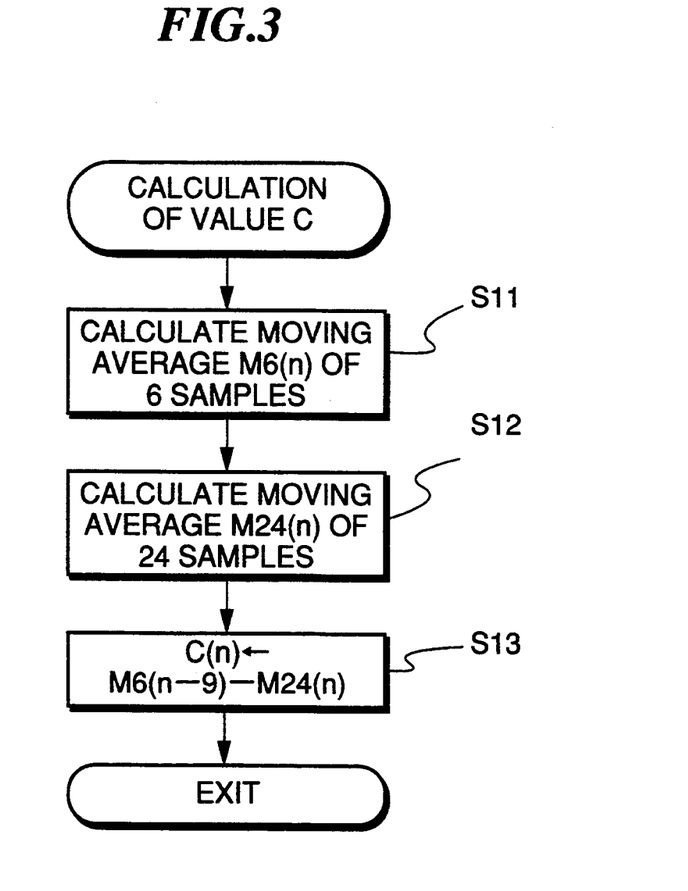
FIG. 3 is a flowchart showing a subroutine for calculating a value C at a step of the FIG. 2 main routine.

FIG. 3 shows a subroutine for calculating the value C executed at the step S1 of the FIG. 2 main routine.

At a step S11, a moving average (first average velocity) M6(n) of six samples starting from a measured value $\omega(n-5)$ of the angular velocity of the crankshaft obtained five stages earlier to the present value $\omega(n)$ of the angular velocity of the crankshaft, by the use of the following equation (1):

$$M6(n) = (1/6) \times \sum_{i=-5}^{0} \omega(n + i) \quad (1)$$

Figure 4:
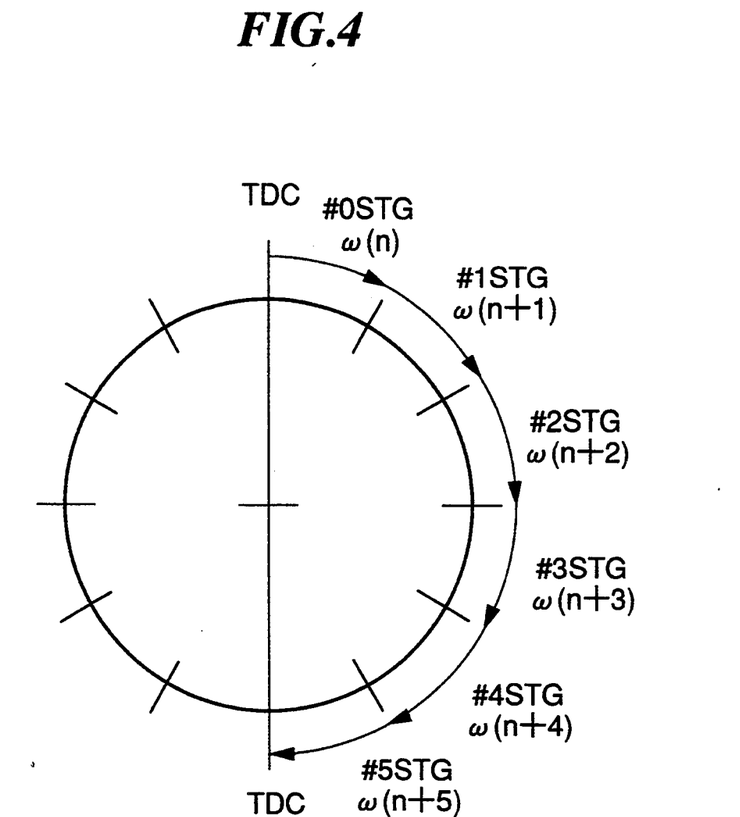
FIG. 4 is a diagram showing the relationship between rotational angle ranges of a crankshaft and a parameter indicative of the engine rotational speed measured in each of the rotational angle ranges.

As is apparent from FIG. 4, the angular velocity $\omega$ is calculated whenever the crankshaft rotates through 30 degrees (i.e. in synchronism with generation of CRK signal pulses), based on time intervals of occurrence of CRK signal pulses, sequentially as $\omega(n)$, $\omega(n+1)$, $\omega(n+2)$, . . . . As shown in FIG. 4, each range of the rotational angle of the crankshaft covering 30 degrees is sequentially designated as #0 stage (#0STG) to #5 stage (#5STG) starting from the position corresponding to the top dead point. Therefore, one CRK signal pulse is generated during each stage. The aforementioned TDC signal pulses are each generated at the #5 stage, immediately before the top dead point (TDC) is actually reached in each cylinder.

In the present embodiment, the engine 1 is a 4-cylinder/4 stroke-cycle engine, wherein spark ignition is carried out at any one of the cylinders whenever the crankshaft rotates through 180 degrees. Therefore, by averaging six sequential samples of the angular velocity value ω(n), produced over an interval of adjacent TDC signal pulses, it is possible to remove high-frequency variation components of rotational speed of the engine having frequencies equal to or higher than a value equivalent to twice the rotational speed of the engine.

At the following step S12, a moving average (second average velocity) M24(n) of twenty-four samples starting from a measured value ω(n−23) of the angular velocity of the crankshaft obtained twenty-three stages earlier to the present value ω(n) of same, by the use of the following equation (2):

$$M24(n) = (1/24) \times \sum_{i=-23}^{0} \omega(n + i) \qquad (2)$$

By averaging twenty-four sequential samples of the angular velocity value ω(n), produced over a time period corresponding to one cycle of operation (i.e. four strokes of a cylinder) of the engine, it is possible to remove high-frequency variation components of rotational speed of the engine having frequencies equal to or higher than a value equivalent to half the rotational speed of the engine.

A value C is is calculated as a difference in the average velocities M6 and M24 by the use of the following equation (3):

$$C(n) = M6(n-9) - M24(n) \qquad (3)$$

In this equation, as the first average velocity M6, a value obtained nine stages earlier is used in order to make the centers of sequences of samples or values from which the two average velocities are calculated, identical to each other in respect of timing. Since the first average velocity M6(n−9) is free of high-frequency variation components having frequencies equal to or higher than the value equivalent to twice the rotational speed of the engine and the second average velocity M24(n) is free of high-frequency variation components having frequencies equal to or higher than the value equivalent to half the rotational speed of the engine, the resulting difference between the first and second average velocities M6(n−9) and M(24) represents a variation component in a frequency range of half the frequency of rotational speed of the engine and twice the frequency of same. This variation component in the above frequency range tends to increase when a misfire occurs, and hence it is possible to accurately detect a misfire by the use of the value C. More specifically, when a misfire occurs to decrease the angular velocity of rotation of the crankshaft, it is largely reflected on the first term M6(n−9) of the right side of the above equation (3) nine stages later so as to decrease a value of same, which results in a marked drop of the value C over following six stages.

Figure 7:
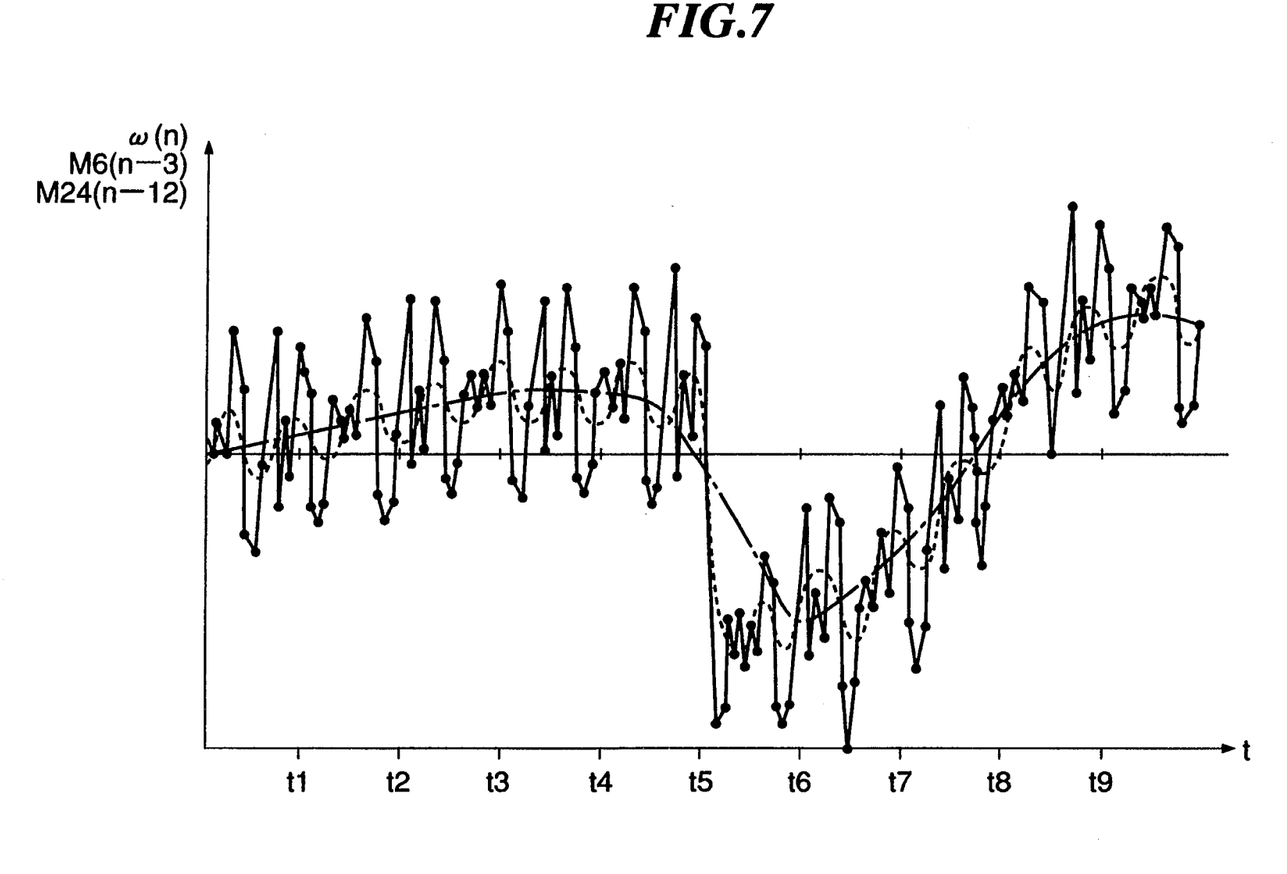
FIG. 7 is a diagram showing changes in an engine rotational speed, i.e., an angular velocity ($\omega(n)$) of a crankshaft, and average values ($M6(n-3)$ and $M24(n-12)$) thereof.
Figure 8:
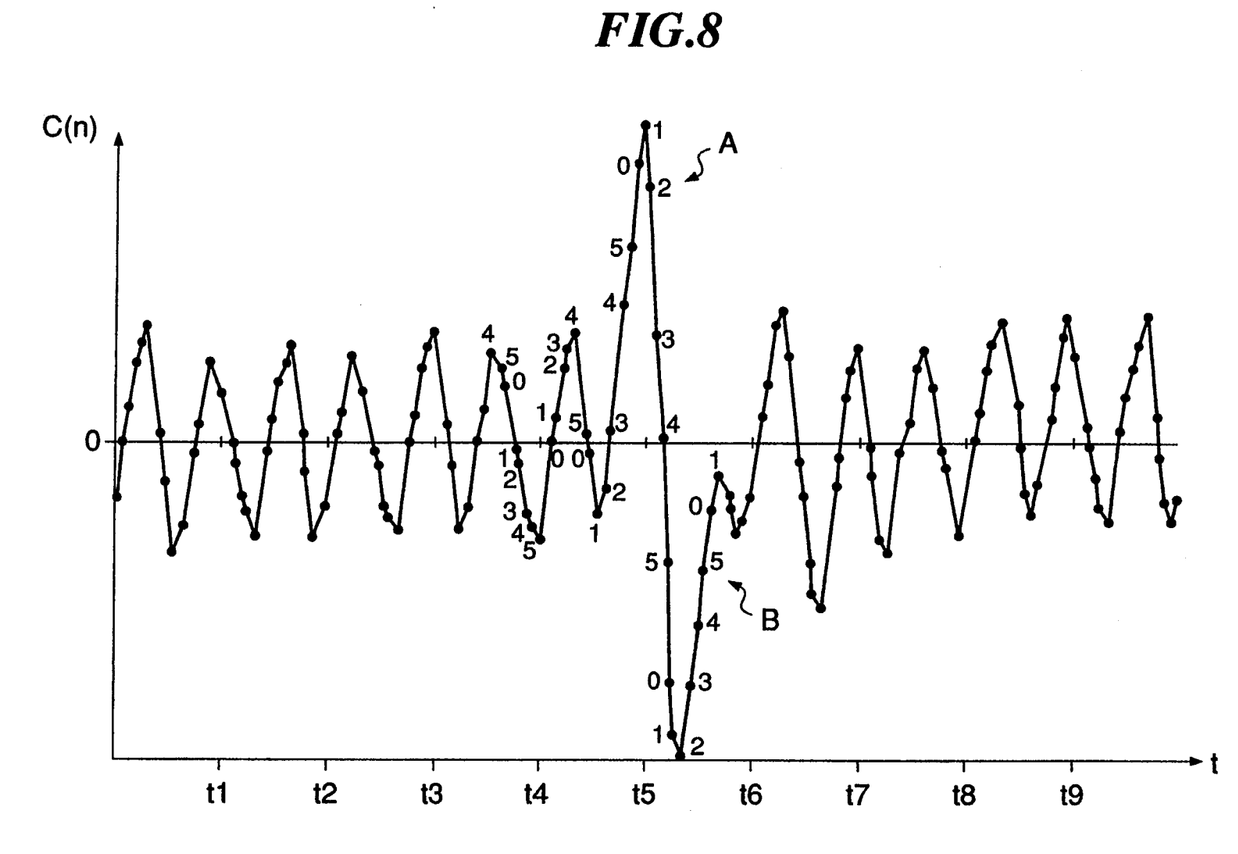
FIG. 8 is a diagram showing changes in a difference ($C(n)$) between the two average values ($M6(n-9)$ and $M24(n)$) of the engine rotational speed.

FIG. 7 shows changes of the angular velocity value ω(n), the first average velocity M6(n−3), and the second average velocity M24(n−12), indicated by the solid line, the broken line, and the one-dot chain line, respectively. Although the first and second average velocities M6' and M24 in FIG. 7 are calculated at timings different from those of the equation (3), patterns of variations in the velocities appearing in respective waveforms are identical between the two cases, though shifted in phase. FIG. 8 shows changes of the value C calculated by the use of the equation (3). In FIG. 8, numerals 0 to 5 indicate the #0 stage to #5 stage (see FIG. 4), respectively, at which each value of the value C is calculated.

Figure 5:
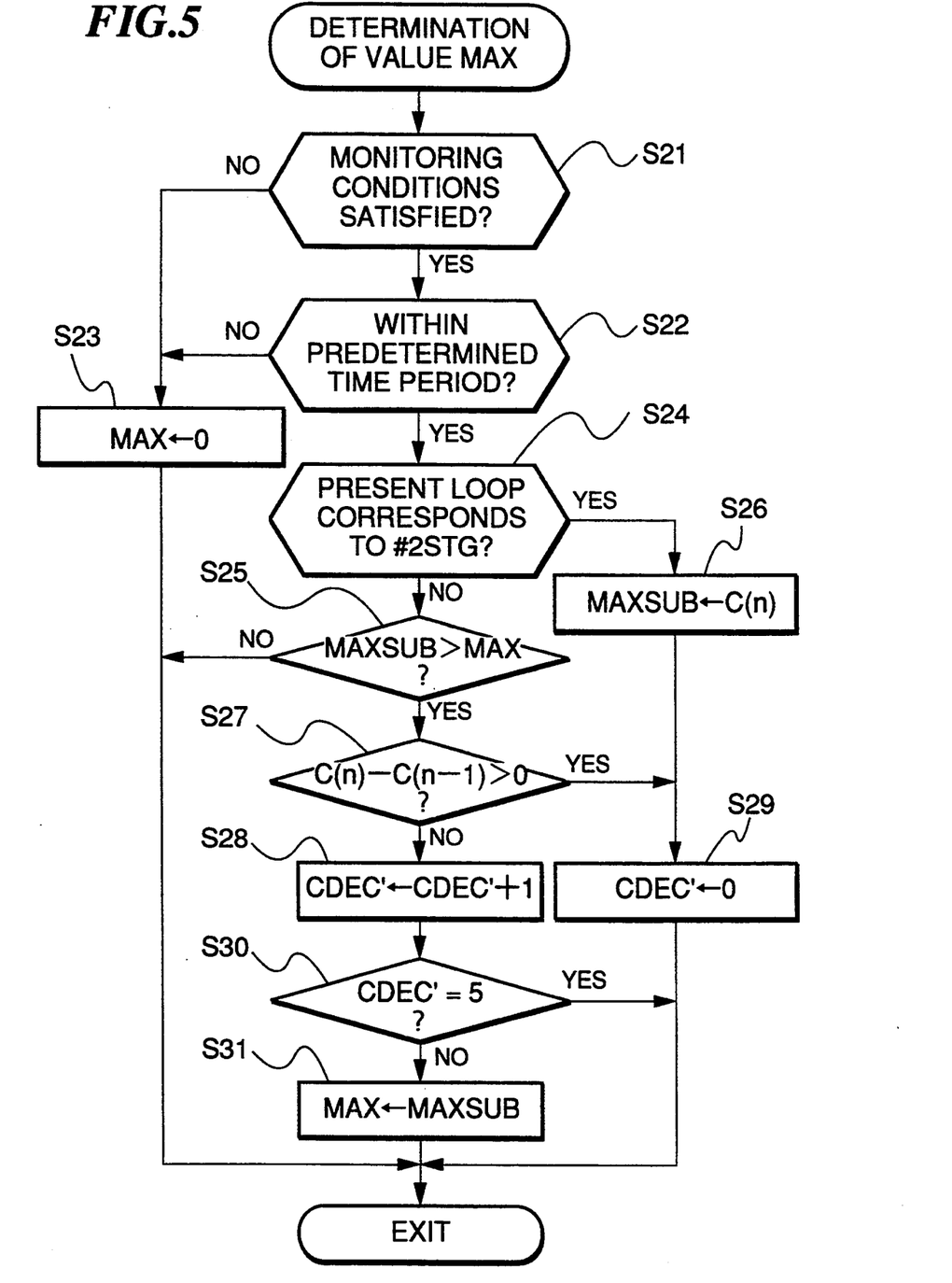
FIG. 5 is a flowchart showing a subroutine for calculating a value MAX at a step of the FIG. 2 main routine.

FIG. 5 shows a subroutine for calculating a value MAX at the step S2 of the FIG. 2 main routine. The value MAX is a reference parameter used for detecting a state in which there is a high possibility of occurrence of a misfire, and used in misfire determination processing, described hereinafter with reference to FIG. 6.

First, at a step S21, it is determined whether or not monitoring conditions are satisfied, i.e. whether or not the misfire determination is allowed to be carried out. The monitoring conditions are satisfied when the engine is in a steady operating condition, while the engine coolant temperature TW, the intake air temperature TA, the engine rotational speed NE, etc. fall within respective predetermined value ranges.

If the monitoring conditions are not satisfied, the value MAX is set to a value of 0 at a step S23, followed by terminating the program, whereas if the monitoring conditions are satisfied, it is determined at a step S22 whether or not the present loop is within a predetermined time period after the monitoring conditions have been satisfied. If the answer to this question is negative (NO), i.e. if the predetermined time period has elapsed, the program proceeds to the step S23.

If the answer to the question of the step S22 is affirmative (YES), i.e. if the present loop is within the predetermined time period after the monitoring conditions have been satisfied, it is determined at a step S24 whether or not the present loop corresponds to the #2 stage. If the present loop corresponds to the #2 stage, the present value C(n) of the value C, i.e. the value C(n) obtained at the #2 stage is set to a value MAXSUB at a step S26, and then a counter CDEC, not shown, is set to a value of 0 at a step S29, followed by terminating the program.

If the present loop does not correspond to the #2 stage, it is determined at a step 25 whether or not the value MAXSUB is larger than the value MAX. If the answer to this question is negative (NO), i.e. if MAXSUB≦MAX, the routine is immediately terminated, whereas if the answer to this question is affirmative (YES), i.e. if MAXSUB>MAX, it is determined at a step S27 whether or not a difference (C(n)−C(n−1)) between the present value C(n) of the value C and the immediately preceding value C(n−1) of the value C is positive or higher than 0. If the difference (C(n)−C(n−1)) is positive, the program proceeds to the step S29, whereas if it is zero or negative, i.e. not higher than 0, the program proceeds to a step S28, where a count value CDEC' of the counter CDEC is increased by an incremental value of 1, and then it is determined at a step S30 whether or not the resulting count value CDEC' of the counter CDEC is equal to 5. If CDEC'=5, the present program is immediately terminated, whereas if CDEC'<5, the value MAX is set, i.e. updated to the value MAXSUB, at a step S31, followed by terminating the program.

According to the value MAX-calculating processing by the FIG. 5 subroutine, the largest value of values of the value C(n) obtained at the #2 stage within the predetermined time period after the monitoring conditions were satisfied is set to the value MAX.

Figure 6:
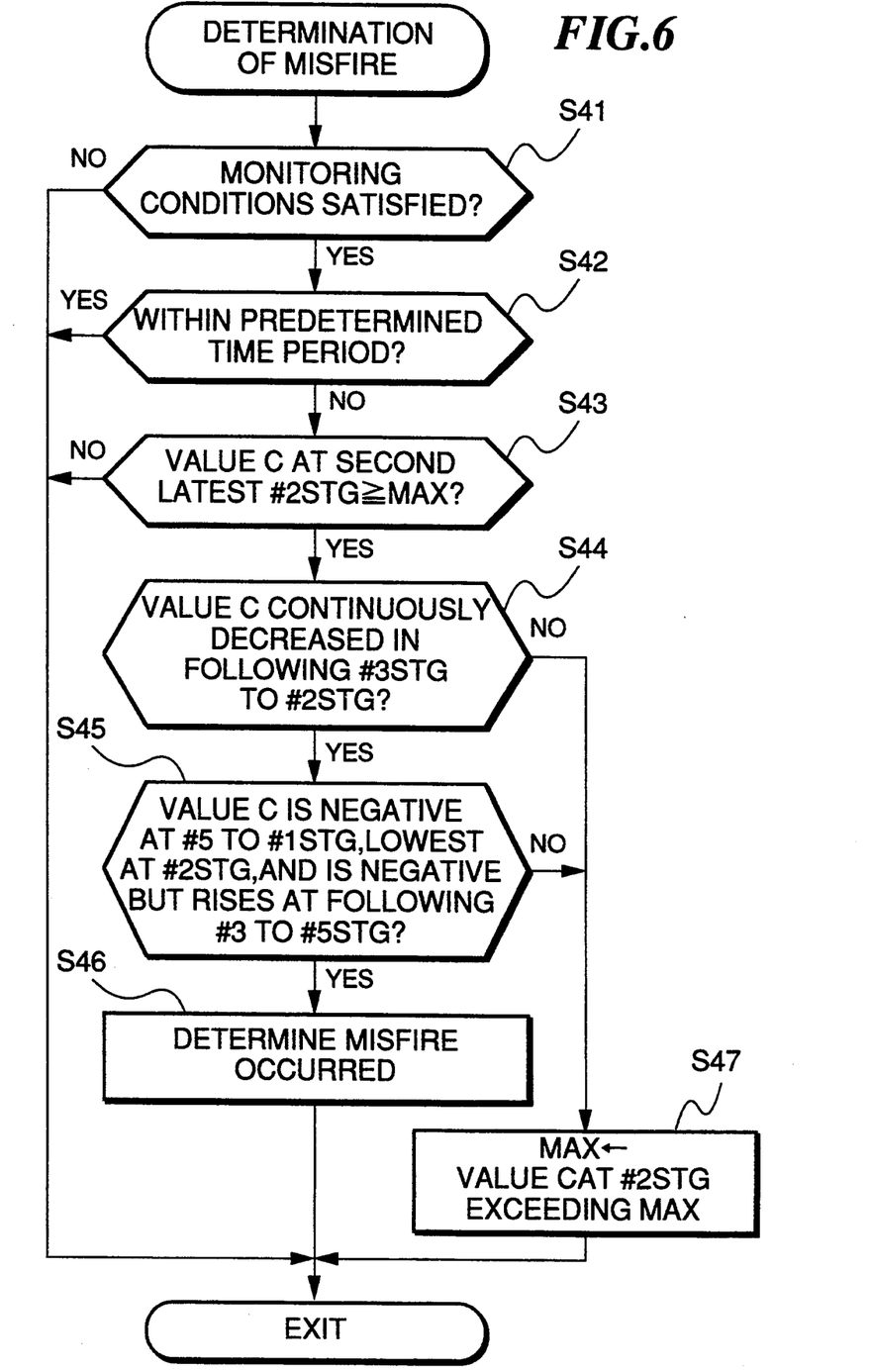
FIG. 6 is a flowchart showing a subroutine for carrying out misfire determination at a step of the FIG. 2 main routine.

FIG. 6 shows a subroutine for carrying out misfire determination at the step S3 of the FIG. 2 main routine.

First, at steps S41 and S42, determination concerning fulfillment of the monitoring conditions is performed, which is identical to that carried out at the steps S21 and S22 in the FIG. 5 subroutine. If the predetermined time period has elapsed after the monitoring conditions have been satisfied, the program proceeds to a step S43, where it is determined whether or not a value of the value C obtained at the #2 stage on an immediately preceding occasion but one, i.e. the #2 stage of an immediately preceding TDC cycle (#0 to #5 stages) but one, is equal to or larger than the value MAX set by the FIG. 5 routine. If this value of the value C corresponding to the #2 stage on the immediately preceding occasion but one is smaller than the value MAX, the present routine is immediately terminated, whereas if the former is equal to or larger than the latter, it is determined at a step S44 whether or not the values of the value C at the following #3 to #2 stages have continuously decreased.

If the answer to this question is affirmative (YES), i.e. if the the values of the value C at the #3 to #2 stages have continuously decreased, it is determined at a step S45 Whether or not values of the value C obtained at the #5 stage to #1 stage of the above #3 to #2 stages are negative, with a value of the value C obtained at the #2 stage assuming the lowest value, and values of the value C obtained at the following #3 to #5 stages are negative and have continued to rise. If the answer to this question is affirmative (YES), that is, if a characteristic of variation of the value C as indicated by a sequence of values starting from one corresponding to the #2 stage indicated by A in FIG. 8 to one corresponding to the #5 stage indicated by B in FIG. 8 is detected, it is determined at a step S46 that a misfire has occurred.

If either the answer to the question of the step S44 or that to the question of the step S45 is negative (NO), i.e. if the characteristic of variation of the value C as indicated by the sequence of values from one indicated by A to one indicated by B is not detected, the value MAX is set to the value c applied at the step S43 and found exceeding the value MAX, at a step S47, followed by terminating the program.

After the misfire determination processing shown in FIG. 6, discrimination of a cylinder in which a misfire has occurred is carried out at the step S5 of the FIG. 2 main routine. In the present embodiment, a cylinder in which ignition was effected 9 or 10 stages earlier than the stage indicated by A in FIG. 8 is determined to be a misfiring cylinder.

As described heretofore, according to the present embodiment, the value C, which is a difference between the average velocity M6(n−9) over a time period identical to duration of one TDC cycle (i.e. an interval of two adjacent TDC signal pulses) and the average value M24(n) over a time period identical to duration of four TDC cycles (one cycle of operation of 4-stroke cycle engine), is calculated to extract variation components having frequencies falling within a range between half the frequency equivalent to the rotational speed of the crankshaft, i.e. the engine, and twice the frequency equivalent to same, which are markedly large when a misfire occurs. Misfire determination is performed on the basis of variation components thus extracted, which makes it possible to determine a misfire in an accurate manner by eliminating adverse effects resulting from variations in output characteristics of the crank angle sensor, the engine, etc.

In addition, as the value of the first average velocity M6 used in the above equation (3) for calculating the value C, there may be used a value M6(n) calculated at the present stage where the value C(n) is calculated. In this case, a characteristic of variation in the value C peculiar to occurrence of a misfire will be slightly different from that shown in the present embodiment.

What is claimed is:

1. A combustion state-detecting system for an internal combustion engine having a crankshaft and at least one cylinder, including crank angle signal-generating means for generating a crank angle signal indicative of a crank angle of said crankshaft at a repetition period corresponding to a predetermined rotational angle of of said crankshaft, said repetition period being shorter than a repetition period of ignition of said engine, and rotational speed-detecting means for detecting a rotational speed of said engine whenever said crank angle signal is generated, said combustion state-detecting system comprising:

first averaging means for calculating a first average speed by averaging said rotational speed of said engine over a time period corresponding to duration of one stroke of one of said at least one cylinder;

second averaging means for calculating a second average speed by averaging said rotational speed of said engine over a time period corresponding to duration of one cycle of all strokes of said one of said at least one cylinder; and combustion state-detecting means for calculating a difference between said first average speed and said second average speed, and determining based on said difference whether or not said combustion state of said engine is abnormal.

2. A combustion state-detecting system according to claim 1, wherein said combustion state-detecting means determines whether or not said combustion state of said engine is abnormal, by comparing said difference between said first average speed and said second average speed with a value of a predetermined reference parameter.

3. A combustion state-detecting system according to claim 1, wherein said combustion state-detecting means determines that said combustion state of said engine is abnormal when a characteristic of variation in said difference between said first average speed and said second average speed agrees with a predetermined reference characteristic of said variation in said difference between said first average speed and said second average speed peculiar to occurrence of a misfire.

4. A combustion state-detecting system according to claim 3, wherein said predetermined characteristic of said variation in said difference between said first average speed and said second average speed is that said difference continues to change in the same direction over whole of said time period corresponding to duration of one stroke of one of said at least one cylinder.

5. A combustion state-detecting system according to claim 4, wherein said predetermined characteristic of said variation in said difference is that a value of said difference obtained by subtracting said second average speed from said first average speed assumes a negative value over said whole of said time period corresponding to one stroke of one of said at least one cylinder, except for a starting portion thereof, with said value of said difference obtained becoming lowest at an end portion of said time period corresponding to duration of one stroke of said at least one cylinder, and assumes a negative value over a time period corresponding to a starting portion of the following time period corresponding to duration of one stroke of said one of said at least one cylinder, with an absolute value of this negative value being reduced.

* * * * *